United States Patent
Gottwick et al.

(10) Patent No.: US 7,359,790 B2
(45) Date of Patent: Apr. 15, 2008

(54) APPARATUS FOR CONVERTING ENERGY THAT CAN BE OPERATED WITH FUEL, IN PARTICULAR FUEL CELL ASSEMBLY

(75) Inventors: Ulrich Gottwick, Stuttgart (DE); Martin Moeller, Stuttgart (DE); Rainer Saliger, Bamberg (DE); Kai Kroeger, Stuttgart (DE); Jan-Michael Graehn, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 548 days.

(21) Appl. No.: 11/048,939

(22) Filed: Feb. 2, 2005

(65) Prior Publication Data

US 2005/0171677 A1    Aug. 4, 2005

(30) Foreign Application Priority Data

Feb. 4, 2004    (DE)    ............... 10 2004 005 446

(51) Int. Cl.
*H01M 8/04*    (2006.01)
*G06F 19/00*    (2006.01)

(52) U.S. Cl. ....................... 701/102; 429/22

(58) Field of Classification Search ............... 701/102, 701/101, 114, 1, 36; 429/22, 19, 17; 702/188
See application file for complete search history.

(56) References Cited

U.S. PATENT DOCUMENTS

| | | | | |
|---|---|---|---|---|
| 3,975,913 | A | * | 8/1976 | Erickson .................... 429/17 |
| 6,210,822 | B1 | * | 4/2001 | Abersfelder et al. ......... 429/19 |
| 6,520,273 | B1 | * | 2/2003 | Ishikawa ................... 180/65.3 |
| 6,957,171 | B2 | * | 10/2005 | White et al. ............... 702/188 |
| 7,109,855 | B2 | * | 9/2006 | Appt et al. ................. 340/438 |

FOREIGN PATENT DOCUMENTS

| | | | |
|---|---|---|---|
| JP | 2003-222018 A | * | 8/2003 |
| JP | 2005-123139 A | * | 5/2005 |

* cited by examiner

*Primary Examiner*—Hieu T. Vo
(74) *Attorney, Agent, or Firm*—Michael J. Striker

(57) ABSTRACT

An apparatus for converting energy can be operated with gaseous fuel, in particular a fuel cell assembly with a fuel cell, a fuel reservoir, and consumers, adjusters, sensors, and a monitoring unit. The monitoring unit ascertains consumption by the fuel cell and/or monitors components required for its operation.

16 Claims, 4 Drawing Sheets

APPARATUS FOR CONVERTING ENERGY THAT CAN BE OPERATED WITH FUEL, IN PARTICULAR FUEL CELL ASSEMBLY

BACKGROUND OF THE INVENTION

The invention relates to an apparatus for recovering energy that can be operated with gaseous fuel, in particular a fuel cell assembly, and to a method for its operation.

Mobile fuel cell systems (BC systems) for vehicles with fuel cell drive or an auxiliary power unit (APU), including with reformation on the upstream side, have not yet achieved a state of development suitable for mass production; nor have stationary fuel cell systems. The same is true for hydrogen (H2) internal combustion engines, which are equipped with a corresponding tank for their operation.

One problem in operating gas internal combustion engines and fuel cell assemblies is gas leaks, which because of the long duration of ignitability are dangerous and cannot easily be discovered, especially if a gas such as H2 is used, which is odorless and colorless.

Failure, in the sense of improper function, of components through which gas flows has until now only been noted whenever these components no longer function at all or when external gas sensors respond. The same is true for a defect such as if a valve does not switch correctly and for leaks, that is, when gas escapes. In terms of the safety relevance of these components, very fast or early detection of a defect is important.

SUMMARY OF THE INVENTION

It is therefore the object of the present invention to make an apparatus for converting energy that can be operated with gaseous fuel, in particular a fuel cell assembly, available that is capable of monitoring its own operation in terms of safety, as well as a method for monitoring it.

Further characteristics of advantageous embodiments and refinements of the invention are disclosed in the dependent claims.

Accordingly, an apparatus for converting energy that can be operated with gaseous fuel, as generically defined by the preamble to claim 1, is distinguished in that a monitoring unit is present for ascertaining the gaseous fuel consumption of the apparatus and/or for monitoring components that are required for its operation.

The apparatus for converting energy is indeed preferably a fuel cell assembly, but it may also for instance be a hydrogen internal combustion engine, a natural gas internal combustion engine, or an internal combustion engine with some other gaseous fuel. In principle, all kinds of apparatus for energy conversion that have a gas tank are suitable for being monitored as an overall unit in this way.

In addition, however, the functions of the components in the gas route can be monitored, such as a safety valve that opens defectively or is triggered defectively. The component monitoring can be implemented by comparing the desired behavior of the system, given knowledge of the operating state of individual components, and the actual behavior of the system.

Actual Consumption

For ascertain the actual consumption of the apparatus, the decrease in the supply of fuel in the tank, or the quantity of gaseous fuel delivered, can be measured with appropriate sensors.

In the case of hydrogen, the quantity can for instance be determined by way of fill level sensors located in the tank or by pressure and temperature measurement in the tank. From the change in the values over time, a conclusion can be drawn about the actual consumption. In the case of other H2 storage options (such as liquid H2, metal hydride, nanocarbon, sodium borohydride, "fill level sensors" adapted to the type of storage technique may be also used, that is, sensors that detect the liquid level or the weight, for instance. Alternatively, the mass flow rate at the tank outlet can be detected by sensors.

Thus consumption can be stated for instance as the mass of fuel per unit of time, or a corresponding variable, such as volume per unit of time.

Consumption Model 1 and Consumption Model 2

In a further preferred embodiment, a calculation algorithm for ascertaining model consumption value of the apparatus on the basis of system parameters kept in readiness and of the detected, currently recovered energy is provided. The system parameters required for calculating model consumption values can be stored in memory for that purpose in a data store.

These model consumption values represent a theoretical consumption value for the apparatus that is to be expected on the basis of the energy output by the energy converter. To that end, the energy generated, for instance the current generated by the fuel cell, can be measured.

The consumption model in a fuel cell system can be constructed as follows. The electric current flowing at the time, or a corresponding variable, must be detected and recalculated into the fuel mole current involved in this electric current, which mole current migrates through the fuel cell membrane (for instance, in accordance with the equation current I=Faraday constant times mole current times valence. Multiplying the mole current by the mole mass produces the mass current.

To this value, all the changes in the hydrogen quantities that occur on the anode side and are still unconverted are added. The quantity of anode gas is ascertained via pressure detection, for instance. All the gas quantities that are withdrawn from the system either intermittently or permanently via additional valves, such as those that are allowed to recirculate or are bled off as residual gas. The recirculation proportion is fuel that is not converted by the fuel cell assembly and accordingly is returned to the process again.

The recirculation proportion can be measured with an H2 mass flow rate meter, for instance, or can be estimated. The proportion bled off can be estimated from the opening times of the bleeder valves. The consumption can also be stated in other suitable variables, such as mass or mole.

Comparison of Model Consumption and Actual Consumption

In another embodiment, a compensation algorithm can be present for monitoring the actual consumption of the fuel cell compared with model consumption values. The comparison between a consumption model and the actual consumption offers a fast, simple, reliable way to notice the unwanted escape of hydrogen.

All the necessary information is known to the monitoring unit; no additional sensors are required. If H2 sensors are additionally present for monitoring safety, then redundance between detected leakage can even be created from consumption monitoring and the additional H2 sensors. The precise knowledge of the consumption can also serve as an input variable for additional monitoring logic elements.

In a further, preferred embodiment, a monitoring algorithm is present for monitoring one or more metering components required for operation, such as valve, throttle valves, fans, compressors, and the like, as well as sensors, for their proper function. By means of this monitoring algorithm, the components can be checked for proper function in accordance with the function definition by the monitoring unit in a time- and/or event-controlled fashion.

In by comparison a modified embodiment, a monitoring algorithm is present for performance-graph-based monitoring of one or more components required for operation, such as valve, throttle valves, fans, compressors, and the like, for their proper function. As a result, it is possible on the basis of performance graphs to check or monitor the proper status of the applicable components. In the performance graphs, corresponding parameters can be stored in memory, so that for instance a predetermined angular position of a throttle valve can be assigned a suitable flow quantity that can be checked for correctness by the monitoring unit by means of the monitoring algorithm. What is important is that via the characteristic curves, flow quantities are determined, and from them a further model consumption can be determined.

In an embodiment that by comparison is more preferable, it may be provided that an evaluation algorithm is present for locating a malfunction in the apparatus. By means of this evaluation algorithm, once a malfunction is detected, monitoring of individual components can be done by the monitoring algorithm for the components until a defective component, if any, is ascertained.

For detecting the individual operating parameters for processing by the monitoring unit, in a preferred embodiment at least one sensor is provided, which detects the physical variables and forwards them to the monitoring unit, examples being a pressure sensor, temperature sensor, moisture sensor, mass flow rate sensor, or gas concentration sensor for hydrogen or oxygen.

In an embodiment that is preferred by comparison, an indicator unit, such as a warning light, is provided for visual indication of malfunctions in the apparatus. The error can also be input into a diagnostic unit if desired and correspondingly read out, or the error can be described in a display. The indicator unit can also inform the driver of the current consumption and the mean consumption.

DETAILED DESCRIPTION OF THE PREFERRED EMBODIMENTS

Figure 1:
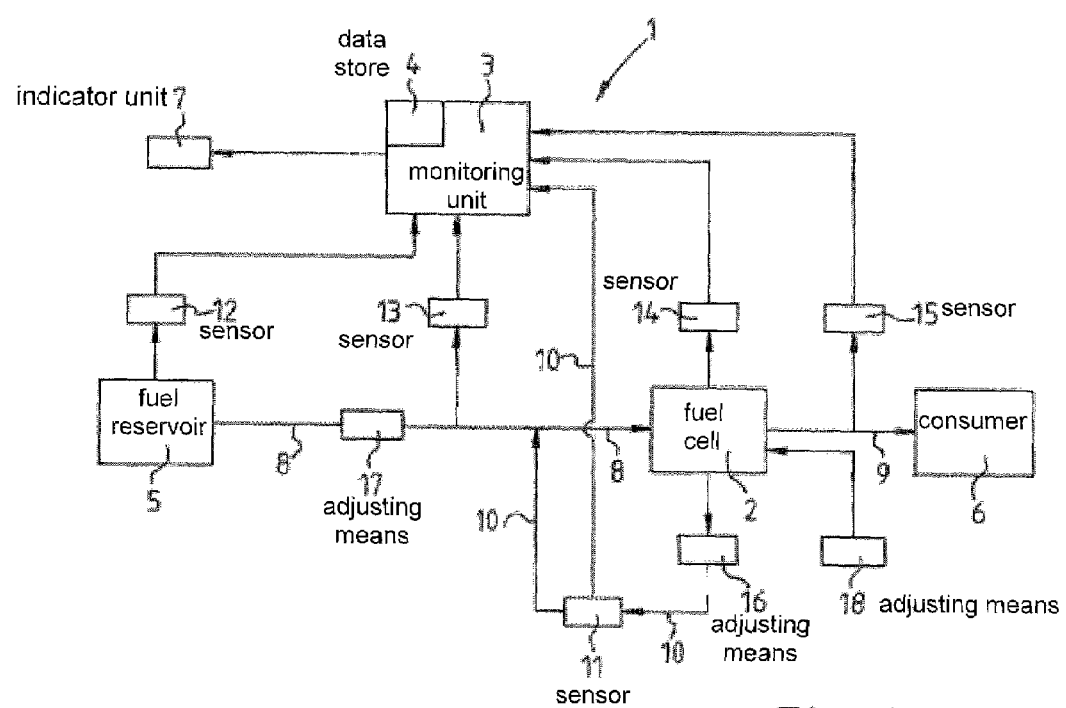
FIG. 1 is a schematic block circuit diagram for an apparatus for recovering energy.

As an exemplary embodiment, FIG. 1 shows a schematic block circuit diagram for a fuel cell assembly 1 with a fuel cell 2, monitoring unit 3, data store 4, and fuel reservoir 5, as well as a consumer 6, adjusting means 16, 17, 18, sensors 11 through 15, and an indicator unit 7. Fuel lines 8 connect the fuel reservoir 5 to the fuel cell 2, from whose outlet a recirculation path 10 leads back to the inlet to the fuel cell 2, so that unconsumed fuel can be returned to the operating loop. An electric line 9 also leads from the fuel cell 2 to the consumer 6, for supplying the latter with electrical current.

The monitoring and testing events for both the entire apparatus and the individual components run in the monitoring unit 3. It processes the various algorithms and furnishes the appropriate results; if needed, still other algorithms are triggered.

Figures 2, 3:
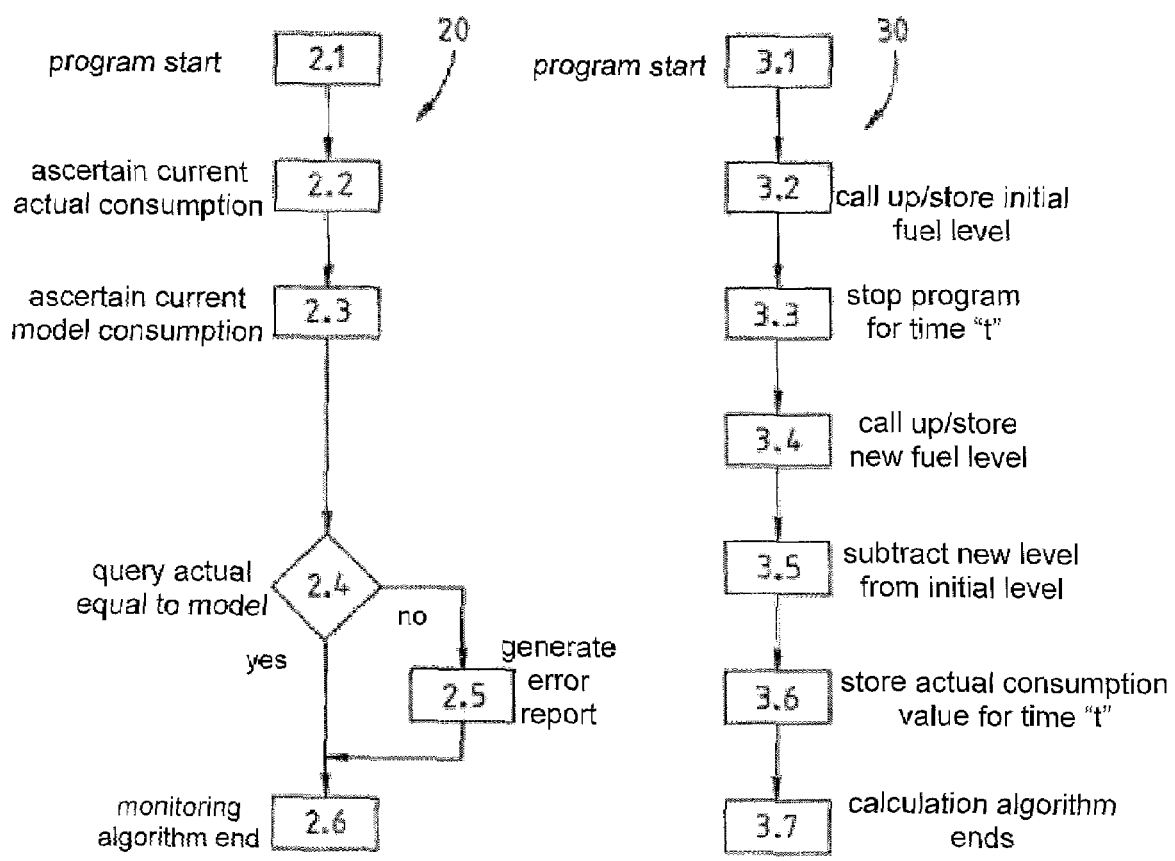
FIG. 2 is a flow chart for a monitoring unit showing program points.
FIG. 3 shows an algorithm flow chart for detecting actual consumption.

To that end, as shown in the flow chart of FIG. 2, at program point 2.1 the monitoring unit 3 starts the execution of a testing algorithm 20. At program point 2.2, the current actual consumption of gaseous fuel by the apparatus is ascertained. At program point 2.3, the current model consumption of gaseous fuel by the apparatus is ascertained. The two program points 2.2 and 2.3 can run selectively either simultaneously or in succession.

At program point 2.4, the results from 2.2 and 2.3 are then compared. At this point an inquiry is made as to whether the actual consumption is equal to the model consumption, including the accepted tolerance. If the comparison at 2.4 has a positive outcome, that is, if the two values are equal, then the end of the testing algorithm 20 is then reached at program point 2.6.

If the actual consumption of the apparatus deviates beyond the accepted tolerance compared to the consumption calculated as a model, an error report is generated at program point 2.5, and the system is stopped if appropriate. Next, again at program point 2.6, the end of the testing algorithm 20 is reached.

In FIG. 3, a flow chart is shown in the form of a calculation algorithm 30 for detecting the actual consumption of the apparatus for recovering energy. At program point 3.1, this algorithm is started. At 3.2, the fuel level in the tank is called up and stored in memory as a value "W1" at time $t_1$. By differentiation of the fuel level over time, the consumption at time $t_1$ is obtained, and the mean consumption in a unit of time is obtained by integrating the consumption. At 3.3, the course of the program is stopped for the time "t". Once this time "t" has elapsed, then at 3.4 the fill level in the tank is again called up and stored as a value "W2". Next, at 3.5, the value "W2" is subtracted from the value "W1", and the result is divided by the time "t". At 3.6, the result from 3.5 is stored in memory as an actual consumption value for the unit of time "t". After this memorization operation, the end of this algorithm is reached at program point 3.7.

Figures 4, 5:
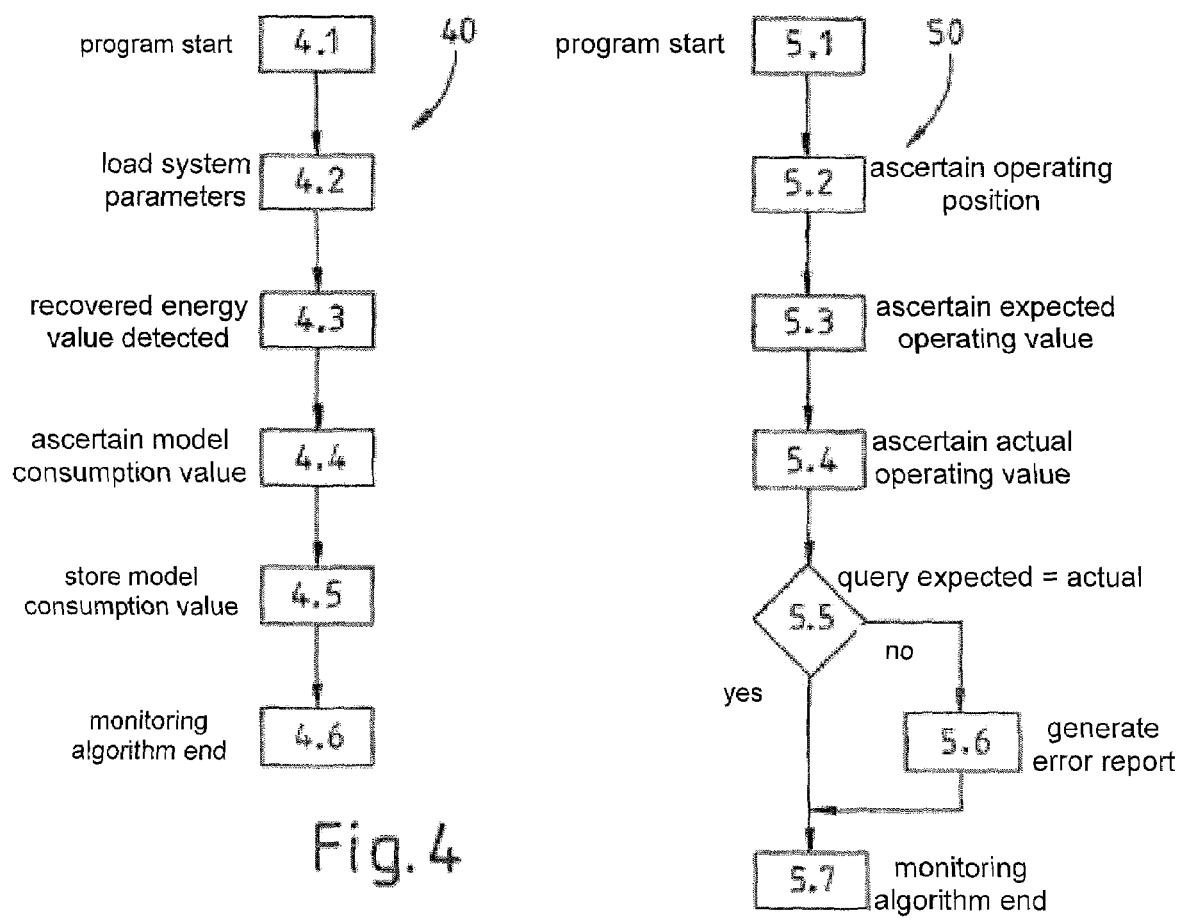
FIG. 4 shows an algorithm flow chart for modeled consumption.
FIG. 5 shows a monitoring algorithm flow chart for components.

In FIG. 4, a flow chart is shown in the form of a calculation algorithm 40 for detecting the model consumption value. At program point 4.1, this calculation algorithm starts. At 4.2, the system parameters kept in readiness are loaded; at 4.3, a value for the currently recovered energy is detected, for instance the current generated by the fuel cell. At 4.4, by linkage of the data from 4.2 and 4.3, the theoretical consumption of the apparatus is ascertained as a model consumption value. Next, in 4.5, this result is stored in memory as a model consumption value, whereupon the end of this routine is reached at 4.6.

In FIG. 5, the monitoring algorithm 50 for the components is shown. This monitoring algorithm is started at program point 5.1. The operating position of the component to be monitored is ascertained at 5.2. The operating value to be expected for this setting of the tested component is ascertained at 5.3. The actual operating value of this component is ascertained from system reactions at 5.4, and the inquiry whether the expected operating value is equal to the actual operating value is made at 5.5. If the result of the comparison at 5.5 is positive, then the end of the testing algorithm 20 is then reached at 5.7.

If a deviation in the actual operating value is found in comparison with the expected operating value, then an error report is generated at 5.6, after which once again the end of the monitoring algorithm 50 is reached at 5.7.

Optionally, this algorithm can have recourse to data that are kept in readiness in the form of performance graphs. In that case, the algorithm can run in an altered form.

Figure 6:
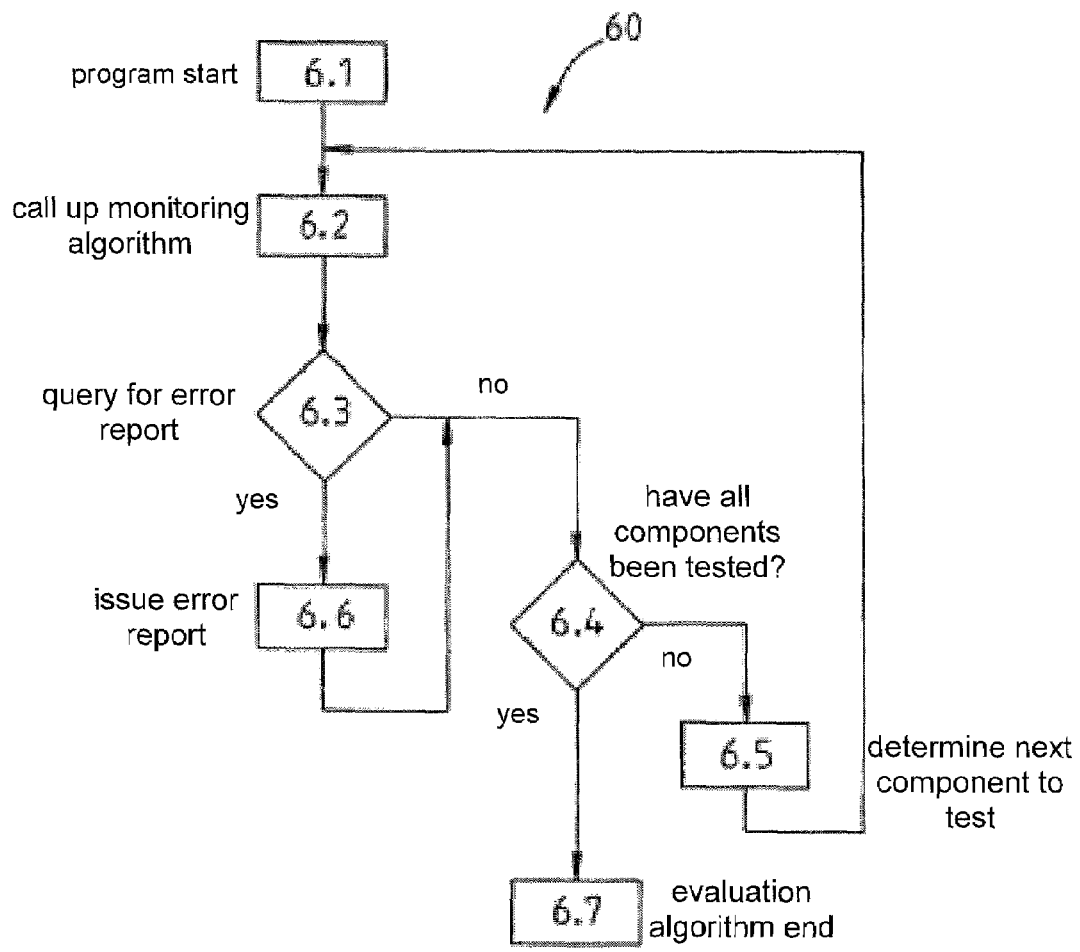
FIG. 6 is an evaluation algorithm flow chart for locating a defective component.

FIG. 6 shows a flow chart for the evaluation algorithm 60 that is provided for locating a defective component in the apparatus. The evaluation algorithm 60 starts at program point 6.1 and determines a component to be tested. At 6.2, the evaluation algorithm calls up the monitoring algorithm 50 for the components to be tested. At 6.3, it is asked whether an error has been reported. If no error has been reported, then at 6.4 the question is asked whether all the components to be tested have already been tested. If not all the components have been tested yet, then at 6.5 the next component to be tested is determined, and a jump is made back to the beginning of program point 6.2. If all the components have already been tested and no error has been reported, then the evaluation algorithm for this program branch ends at 6.7.

If at 6.3 an error is found for the tested component, then at program point 6.6 an error report about the defective component is issued. Next, a jump is made to the beginning of program 6.4.

The invention is not limited to the exemplary embodiment shown and described. On the contrary, it includes all variant embodiments within the scope of the claims.

The invention claimed is:

1. A fuel cell assembly operating with gaseous fuel, comprising a monitoring unit (3) for ascertaining the consumption of gaseous fuel by the fuel cell assembly, and a calculation algorithm (30) for ascertaining the actual gaseous fuel consumption of the fuel cell assembly.

2. The fuel cell assembly according to claim 1, further comprising a monitoring algorithm (50) for monitoring one or more components that are required for operation of the fuel cell assembly.

3. The fuel cell assembly according to claim 2, further comprising an evaluation algorithm (60) for locating a malfunction in the fuel cell assembly.

4. The fuel cell assembly according to claim 3, further comprising an indicator unit (7) for visually indicating a malfunction in the fuel cell assembly.

5. The fuel cell assembly according to claim 2, further comprising at least one sensor for detecting operating parameters and forwarding them to the monitoring unit (3).

6. A fuel cell assembly operating with gaseous fuel, comprising a monitoring unit (3) for ascertaining the consumption of gaseous fuel by the fuel cell assembly, and a calculation algorithm (40) for ascertaining a model consumption value of the fuel cell assembly on the basis of a system parameter kept in readiness and a value for energy recovered from the fuel cell assembly.

7. The fuel cell assembly according to claim 6 further comprising a monitoring algorithm (50) for monitoring one or more components that are required for operation of the fuel cell assembly.

8. The fuel cell assembly according to claim 7, further comprising an evaluation algorithm (60) for locating a malfunction in the fuel cell assembly.

9. The fuel cell assembly according to claim 8, further comprising an indicator unit (7) for visually indicating a malfunction in the fuel cell assembly.

10. The fuel cell assembly according to claim 7, further comprising at least one sensor for detecting operating parameters and forwarding them to the monitoring unit (3).

11. A fuel cell assembly operating with gaseous fuel, comprising a monitoring unit (3) for ascertaining the consumption of gaseous fuel by the fuel cell assembly, and a compensation algorithm (2.4) for monitoring the actual consumption of gaseous fuel by the fuel cell (2) in comparison with a model consumption value.

12. The fuel cell assembly according to claim 11 further comprising a monitoring algorithm (50) for monitoring one or more components that are required for operation of the fuel cell assembly.

13. The fuel cell assembly according to claim 12, further comprising an evaluation algorithm (60) for locating a malfunction in the fuel cell assembly.

14. The fuel cell assembly according to claim 13, further comprising an indicator unit (7) for visually indicating a malfunction in the fuel cell assembly.

15. The fuel cell assembly according to claim 12, further comprising at least one sensor for detecting operating parameters and forwarding them to the monitoring unit (3).

16. A method for detecting an error in the operation of a fuel cell assembly consuming gaseous fuel comprising the method steps of:
   providing gaseous fuel for the fuel cell assembly to provide energy,
   ascertaining an actual value for the consumption of gaseous fuel by the fuel cell assembly by a monitoring unit (3),
   ascertaining a model value for the consumption of gaseous fuel by the fuel cell assembly, and
   determining whether a difference between the actual and model values for the consumption of gaseous fuel exceeds a predetermined threshold value
   indicative of an error in the operation of the fuel cell assembly.

* * * * *